United States Patent [19]

Matsui et al.

[11] Patent Number: 4,692,419

[45] Date of Patent: Sep. 8, 1987

[54] SILICON NITRIDE SINTERED BODY AND MANUFACTURING METHOD THEREOF

[75] Inventors: Minoru Matsui; Takao Soma, both of Nagoya, Japan

[73] Assignee: NGK Insulators, Ltd., Japan

[21] Appl. No.: 892,249

[22] Filed: Aug. 4, 1986

[30] Foreign Application Priority Data

Sep. 17, 1985 [JP] Japan .................. 60-204986

[51] Int. Cl.$^4$ .............................................. C04B 35/58
[52] U.S. Cl. ........................................ 501/97; 264/65; 264/125; 501/98; 501/104; 501/105; 501/118; 501/123; 501/127; 501/152; 501/153
[58] Field of Search .................... 501/97, 98, 118, 123, 501/127, 152, 153, 104, 105; 264/65, 125

[56] References Cited

U.S. PATENT DOCUMENTS

| | | | |
|---|---|---|---|
| 4,134,947 | 1/1979 | Oda et al. ............................ | 501/97 |
| 4,218,257 | 8/1980 | Oda et al. ............................ | 501/97 |
| 4,376,742 | 3/1983 | Mah .................................... | 501/97 |
| 4,535,063 | 8/1985 | Matsuhiro et al. .................. | 501/97 |
| 4,609,633 | 9/1986 | Fukuhara et al. ................... | 501/97 |

Primary Examiner—Stephen J. Lechert, Jr.
Attorney, Agent, or Firm—Parkhurst & Oliff

[57] ABSTRACT

A silicon nitride sintered body essentially consisting of compounds of Sr, Mg, Ce, Zr and Al in amounts of from 0.1 to 18% by weight when calculated as SrO, from 0.2 to 25% by weight when calculated as MgO, from 0.1 to 20% by weight when calculated as $CeO_2$, from 0.1 to 15% by weight when calculated as $ZrO_2$ and from 1 to 20% by weight when calculated as $Al_2O_3$, respectively, and the balance being silicon nitride. A method of manufacturing the silicon nitride sintered body is also disclosed. The silicon nitride sintered body has a low thermal conductivity while high mechanical strength and high fracture toughness being maintained.

8 Claims, No Drawings

SILICON NITRIDE SINTERED BODY AND MANUFACTURING METHOD THEREOF

BACKGROUND OF THE INVENTION

1. Field of the Invention

The present invention relates to a silicon nitride sintered body which is high in mechanical strength and fracture toughness and low in thermal conductivity and a method of manufacturing the same.

2. Related Art Statement

Since the silicon nitride sintered body is excellent in the mechanical strength, fracture toughness, thermal resistance, thermal shock resistance, etc., its uses as the thermal resistive high strength materials have been actively being developed.

Since silicon nitride is a substance having a strong covalent bonding property and has extremely poor sinterability itself, it is known that a sintering aid such as MgO, $Al_2O_3$, $Y_2O_3$, $ZrO_2$ or the like is generally added to obtain high density sintered bodies. Among them, as the sintered bodies being high in mechanical strength and fracture toughness, there are known from Japanese patent application Laid-open No. sho 59-149,981 silicon nitride sintered bodies containing oxides or oxynitrides of Sr, Mg, a rare earth element and Zr.

However, although the above-mentioned silicon nitride sintered bodies possess high mechanical strength and high fracture toughness, they have a drawback that the heat conductivity thereof is too high, for instance, when they are used as engine parts necessitating the heat insulation. That is, the thermal conductivity of the above-mentioned silicon nitride sintered bodies is unfavorably about 0.07 (cal/cm.sec.°C.), which is too high for the application to parts such as engine parts which need the heat insulating property.

SUMMARY OF THE INVENTION

It is an object of the present invention to overcome the above-mentioned defects, and is to provide a silicon nitride sintered body which maintains high mechanical strength and high fracture toughness and is low in thermal conductivity.

Another object of the present invention is to provide a method of manufacturing such a silicon nitride sintered body.

According to the present invention, there is a provision of a silicon nitride sintered body which essentially consists of compounds of Sr, Mg, Ce, Zr and Al in amounts of from 0.1 to 18% by weight when calculated as SrO, from 0.2 to 25% by weight when calculated as MgO, from 0.1 to 20% by weight when calculated as $CeO_2$, from 0.1 to 15% by weight when calculated as $ZrO_2$ and from 1 to 10% by weight when calculated as $Al_2O_3$, respectively, and the balance being silicon nitride.

According to another aspect of the present invention, there is a provision of a method of manufacturing a silicon nitride sintered body, which comprises steps of preparing and molding a formulated raw material essentially consisting of compounds of Sr, Mg, Ce, Zr and Al in amounts of from 0.1 to 18% by weight when calculated as SrO, from 0.2 to 25% by weight when calculated as MgO, from 0.1 to 20% by weight when calculated as $CeO_2$, from 0.1 to 15% by weight when calculated as $ZrO_2$ and from 1 to 20% by weight when calculated as $Al_2O_3$, respectively, and the balance being a silicon nitride raw material powder, and then firing a resulting molding in a nitrogen atmosphere or an inert gas atmosphere.

The present invention is based on the discovery that when the silicon nitride sintered body is constituted as mentioned above in which the compound of Al in an amount of from 1 to 20% by weight when calculated as $Al_2O_3$ is included into a silicon nitride sintered body having high mechanical strength as well as high fracture toughness, Al solves into $\beta$-$Si_3N_4$ particles or grain boundary phase thereof, whereby the thermal conductivity can be arbitrarily reduced down to about one fifth of that of the conventional articles, while mechanical strength and fracture toughness being maintained.

These and other objects, features and advantages of the invention will be well appreciated upon reading of the following description of the invention with understanding that some modifications, variations and changes of the same could be made by a skilled person in the art to which the invention pertains without departing from the sprit of the invention or the scope of claims appended hereto.

DETAILED DESCRIPTION OF THE INVENTION

The present invention will be explained in more detail below.

It has been formerly known that the compound of Sr, Mg, Ce, Zr or the like aids the densification of $Si_3N_4$, which is difficult to be sintered, through formation of an amorphous substance upon reaction with $Si_3N_4$ and $SiO_2$ in the raw material of silicon nitride during firing even when used alone. However, it is considered that an amorphous substance of an oxide or an oxynitride simultaneously containing Sr, Mg, Ce and Zr has a densification promoting action, which is far higher beyond comparison with an action acquired by any one of them, and has a strength far higher than that of an amorphous substance of the oxide or the oxynitride containing any one of them, and increases the strength of the silicon nitride sintered body as a binding agent of the grain boundaries of $Si_3N_4$.

Furhter, it is also considered that the compound of Zr promotes the densification of $Si_3N_4$ through reaction with the Sr compound, the Mg compound, the Ce compound, $Si_3N_4$ and $SiO_2$ during firing and at the same time a part of the Zr compound appears as the crystalline $ZrO_2$, in the grain boundaries, thereby increasing the fracture toughness of the silicon nitride sintered body.

Next, the reasons for limitations of the ingredients in the silicon nitride sintered body according to the present invention will be described.

The reason why the content of the Al compound in the sintered body according to the present invention is limited to from 1 to 20% by weight when calculated as $Al_2O_3$ is that if it is less than 1% by weight, thermal conductivity is not lowered, while if it is more than 20% by weight, mechanical strength decreases. Further, the reason why the compounds of Sr, Mg, Ce and Zr in the sintered body according to the present invention are limited to from 0.1 to 18% by weight when calculated as SrO, from 0.2 to 25% by weight when calculated as MgO, from 0.1 to 20% by weight when calculated as $CeO_2$ and from 0.1 to 15% by weight when calculated as $ZrO_2$, respectively, is as followed. If any of them is less than the corresponding lower limit, the strength-increasing and toughness-increasing due to the densification-promoting effect and the fine structure-controlling effect, which are exhibited as a synergistic effect by these four elements, can not be fully accomplished, resulting in that numerous pores remain in the sintered body to lower the mechanical strength and the fracture toughness. On the other hand, if any one of these elements exceeds the corresponding upper limit, the properties of a secondary phase, which is composed of the compounds of Sr, Mg, Ce and Zr and formed at the grain boundaries of the $Si_3N_4$ crystals, approach those appearing when the constituting element which is contained in the largest amount is singly employed, so that the synergistic effect of the four elements is not exhibited. Among them, the coefficient of thermal expansion of the Zr compound is about 3 times higher than that of the $Si_3N_4$. Thus, if the Zr compound is present in an unnecessarily great amount as the secondary phase of the silicon nitride sintered body, the coefficient of thermal expansion of the sintered body increases to damage the thermal shock resistance. Therefore, it is particularly preferable that the Zr compound does not exceed 15% by weight when calculated as $ZrO_2$.

The silicon nitride sintered body according to the present invention may be produced by the following method.

That is, a formulated raw material is prepared from a raw material powder comprising compounds of Sr, Mg, Ce, Zr and Al as sintering aids in amounts of from 0.1 to 18% by weight, preferably from 0.4 to 12% by weight, when calculated as SrO, from 0.2 to 25% by weight, preferably from 0.5 to 17% by weight, when calculated as MgO, from 0.1 to 20% by weight, preferably from 0.4 to 13% by weight, when calculated as $CeO_2$, from 0.1 to 15% by weight when calculated as $ZrO_2$ and from 1 to 20% by weight when calculated as $Al_2O_3$, respectively, and the balance being silicon nitride. In this case, as a mill, use may be made of a rotary mill, a vibration mill, an attrition mill, etc. Either one of a wet type milling and a type milling may do and a formulated powder amount, an amount of media, a liquid medium, a viscosity of a slurry, etc. may be appropriately selected depending upon a milling system. As the liquid medium, use may be made of acetone, alcohol, water, etc. A milling time depends upon the milling system and volume, and is set at a time during which a milled powder is made fine and the average particle size and the BET specific surface area are saturated up to constant limit values.

In the preparation of the formulated raw material, the compounds of Sr, Mg, Ce, and Al may be milled and mixed during milling or mixed in form of solutions. Mixing of the Zr compound as $ZrO_2$ into the raw material through abrasion of employed media made of zirconia porcelain during the milling step is more preferable as compared with milling and mixing of the Zr compound during milling or mixing thereof in the solution state.

When $ZrO_2$ is added through the abrasion of the media made of zirconia porcelain, the mixed amount of $ZrO_2$ is chemically analyzed in addition to the measurement of the average particle size and the BET specific surface area to control a milling time such that the mixed amount may not exceed 15% by weight.

In order to obtain a high milling effect, the employed media of zirconia porcelain are required to have a specific gravity of not less than 5 and a Mohs hardness of not less than 6. For this purpose, it is preferable that the media have the $ZrO_2$ content of not less than 70% by weight. A spherical profile, a column-like profile or the like may be adopted as a profile thereof. If the outer diameter is too small, coarse particles in the raw material powder will not be milled and therefore the strength of the sintered body will not increase. Thus, the particle size of from 3 to 10 mm, preferably from 4 to 8 mm, is desired.

If necessary, a molding aid such as polyvinyl alcohol is added to the formulated raw material milled up to a desired particle size, and after stirring, the resulting power of slurry is dried to obtain a powder to be molded. The thus obtained power is molded into a desired profile by means of an isostatic press, etc., which is fired at a temperature of 1,650°–1,850° C., preferably 1,670°–1,730° C. in a nitrogen atmosphere or an inert gas atmosphere for a time of 0.2–5 hours, preferably 0.5–2 hours, thereby obtaining a silicon nitride sintered body.

Although the silicon nitride raw powder may be one containing $\alpha$-phase or $\beta$-phase, the one containing not less than 50% by weight of $\alpha$-phase is preferable because the raw powder in which $\alpha$-phase is more than $\beta$-phase gives a sintered body having a higher strength. It is preferable that the total content of Fe, Ca, Na and K as impurities, the average particle size and the BET specific surface area of the raw powder are not more than 3% by weight, preferably not more than 1% by weight, not more than 5 $\mu$m, preferably not more than 1 $\mu$m, and 1–50 $m^2/g$, preferably 5–30 $m^2/g$, respectively.

Any compounds may be used as the compounds of Sr, Mg, Ce, Zr and Al so long as they give oxides or oxynitrides through firing. For instance, use may be made of SrO, $SrCO_3$, $Sr(NO_3)_2.4H_2O$, MgO, $MgCO_3$, $Mg(OH)_2$, $Mg(NO_3)_2.6H_2O$, $CeO_2$, $Ce(NO_3)_3.6H_2O$, $ZrO_2$, $ZrO(OH)_2$, $Al_2O_3$, $Al(NO_3)_3.9H_2O$, etc. which have a purity of not less than 98% by weight. When they are added as powder, it is preferable that the average particle size is not more than 5 $\mu$m and the BET specific surface area is 1–5 $m^2/g$. On the other hand, when they are hydrolized and added after being converted to aqueous solutions of nitrates or alkoxide solutions, decomposed volatile components need be removed through calcination.

In the following, examples of the present invention will be explained more in detail. These examples are merely given in the illustration of the invention, but should never be interpreted to limit the scope thereof.

EXAMPLE 1

A sample was formulated at a recipe shown in Table 1 by using a silicon nitride raw material powder having a purity of about 96% by weight, the average particle size of 0.7 $\mu$m, and the BET specific surface area of 8.5 $m^2/g$, sintering aids having purities of from 98 to 99% by weight and the average particle size of 2–0.5 $\mu$m, and $Al_2O_3$. A formulated material was milled by using 7 mm outer diameter media having an iron core and a surface coated with a nylon resin to prevent admixing of impurities. Into 200 g of a milled raw material within a nylon resin vessel of an inner volume of 1.2 l, 500 ml of acetone and 500 g of media were added and then the mixture was milled at 100 rpm for 300 hours by means of a rotary mill. After the resulting powder was dried, it was hydrostatically press molded under a pressure of 3 tons/cm² into 60×60×6 mm. The resulting molding was sintered at 1,700° C. for one hour under atmospheric pressure, thereby obtaining slicon nitride sintered bodies (Nos. 1 to 12) according to the present invention.

Samples, which compositions were outside of the restriction ranges of the present invention, were separately prepared under the same conditions, thereby obtained comparative example sintered bodies (Nos. 13 to 17). Further, prior art samples (Nos. 18-20) were prepared. Comparison among these sintered bodies were performed through measurements with respect to bulk density, thermal conductivity, and strength. The thermal conductivity was measured according to a laser flash method by using a disc of 10 mm in diameter and 3 thick worked from a sintered body as a sample. As to the strength, a four point bending strength was measured according to JIS R-1601 "Method of testing bending strength of fine ceramics". The bulk density, the thermal conductivity and the strength of the sintered bodies are shown in Table 1.

tered body having high mechanical strength and high fractue toughness.

Consequently, the silicon nitride sintered body according to the present invention can be favorably used, for instance, as the engine parts necessitating the heat insulating property.

What is claimed is:

1. A silicon nitride sintered body consisting essentially of Sr in an amount of from 0.1 to 18% by weight calculated as SrO, Mg in an amount of from 0.2 to 25% by weight calculated as MgO, Ce in an amount of from 0.1 to 20% by weight calculated as $CeO_2$, Zr in an amount of from 0.1 to 15% by weight calculated as $ZrO_2$ and Al in an amount of from 1 to 20% by weight calculated as $Al_2O_3$, the balance being silicon nitride.

2. A silicon nitride sintered body according to claim 1, wherein Sr is present in an amount of from 0.4 to 12% by weight calculated as SrO, Mg is present in an amount of from 0.5 to 17% by weight calculated as MgO, and TABLE 1(a)

| Sample No. | Formulation rates (wt %) | | | | | | Bulk density (g/cm³) | Thermal conductivity (cal/cm. sec. °C.) | Strength at room temperature (MPa) |
|---|---|---|---|---|---|---|---|---|---|
| | $Si_3N_4$ | calculated as $Al_2O_3$ | calculated as SrO | calculated as MgO | calculated as $CeO_2$ | calculated as $ZrO_2$ | | | |
| Present invention | | | | | | | | | |
| 1 | 86.0 | 1.0 | 1.0 | 3.5 | 4.5 | 4.0 | 3.24 | 0.06 | 983 |
| 2 | 80.0 | 1.0 | 2.0 | 2.0 | 12.0 | 3.0 | 3.42 | 0.05 | 946 |
| 3 | 78.5 | 2.5 | 0.4 | 2.0 | 2.0 | 14.6 | 3.45 | 0.05 | 968 |
| 4 | 78.0 | 3.0 | 2.0 | 2.0 | 12.0 | 3.0 | 3.50 | 0.05 | 983 |
| 5 | 84.0 | 3.0 | 1.0 | 3.5 | 4.5 | 4.0 | 3.26 | 0.05 | 934 |
| 6 | 76.0 | 5.0 | 2.0 | 2.0 | 12.0 | 3.0 | 3.49 | 0.04 | 908 |
| 7 | 79.5 | 7.5 | 1.0 | 3.5 | 4.5 | 4.0 | 3.29 | 0.04 | 912 |
| 8 | 73.5 | 7.5 | 0.4 | 2.0 | 2.0 | 14.6 | 3.49 | 0.03 | 953 |
| 9 | 78 | 9.0 | 1.0 | 3.5 | 4.5 | 4.0 | 3.34 | 0.03 | 936 |
| 10 | 71.0 | 10.0 | 0.4 | 2.0 | 2.0 | 14.6 | 3.40 | 0.02 | 915 |
| 11 | 77.0 | 15.0 | 1.0 | 0.5 | 2.5 | 4.0 | 3.30 | 0.02 | 929 |
| 12 | 72.0 | 20.0 | 1.0 | 0.5 | 2.5 | 4.0 | 3.37 | 0.01 | 817 |

TABLE 1(b)

| Sample No. | Formulation rates (wt %) | | | | | | Bulk density (g/cm³) | Thermal conductivity (cal/cm. sec. °C.) | Strength at room temperature (MPa) |
|---|---|---|---|---|---|---|---|---|---|
| | $Si_3N_4$ | calculated as $Al_2O_3$ | calculated as SrO | calculated as MgO | calculated as $CeO_2$ | calculated as $ZrO_2$ | | | |
| Comparative example | | | | | | | | | |
| 13 | 86.9 | 0.1 | 1.0 | 3.5 | 4.5 | 4.0 | 3.30 | 0.07 | 971 |
| 14 | 80.7 | 0.3 | 0.4 | 2.0 | 2.0 | 14.6 | 3.37 | 0.08 | 966 |
| 15 | 59.0 | 22.0 | 2.0 | 2.0 | 12.0 | 3.0 | 3.38 | 0.02 | 484 |
| 16 | 62.0 | 25.0 | 1.0 | 3.5 | 4.5 | 4.0 | 3.33 | 0.01 | 451 |
| 17 | 51 | 30.0 | 0.4 | 2.0 | 2.0 | 14.6 | 3.37 | 0.01 | 387 |
| Prior art | | | | | | | | | |
| 18 | 87.0 | — | 1.0 | 3.5 | 4.5 | 4.0 | 3.29 | 0.07 | 973 |
| 19 | 81.0 | — | 0.4 | 2.0 | 2.0 | 14.6 | 3.39 | 0.07 | 980 |
| 20 | 81.0 | — | 2.0 | 2.0 | 12.0 | 3.0 | 3.43 | 0.07 | 972 |

As obvious from the results of Table 1, the silicon nitride sintered body having a low thermal conductivity and a high strength can be obtained by the manufacturing method of silicon nitrde sintered body according to the present invention.

As evident from the foregoing description, according to the silicon nitride sintered body and the manufacturing method thereof in the present invention, the silicon nitride sintered body having a low thermal conductivity while high mechanical strength and fracture toughness being maintained can be obtained by including an appropriate amount of $Al_2O_3$ into the silicon nitride sin- Ce is present in an amount of from 0.4 to 13% by weight calculated as $CeO_2$.

3. A method of manufacturing a silicon nitride sintered body, which comprises formulating and molding a raw material consisting essentially of Sr in an amount of from 0.1 to 18% by weight calculated as SrO, Mg in an amount of from 0.2 to 25% by weight calculated as MgO, Ce in an amount of from 0.1 to 20% by weight calculated as $CeO_2$, Zr in an amount of from 0.1 to 15% by weight calculated as $ZrO_2$ and Al in an amount of from 1 to 20% by weight calculated as $Al_2O_3$, the balance being silicon nitride; and then firing the resulting molding in a nitrogen atmosphere or an inert gas atmosphere.

4. A method of manufacturing a silicon nitride sintered body according to claim 3, wherein Sr is present in an amount of from 0.4 to 25% by weight calculated as SrO, Mg is present in an amount of from 0.5 to 17% by weight calculated as MgO, and Ce is present in amount of from 0.4 to 13% by weight calculated as $CeO_2$.

5. A method of manufacturing a silicon nitride sintered body according to claim 3, wherein the Zr is introduced into the raw material through abrasion of a zirconia porcelain media during milling.

6. A method of manufacturing a silicon nitride sintered body according to claim 5, wherein the zirconia porcelain media have a specific gravity of not less than 5, Mohs hardness of not less than 6 and a $ZrO_2$ content of not less than 70% by weight.

7. A method of manufacturing a silicon nitride sintered body according to claim 3, wherein the silicon nitride raw material powder contains not less than 50% by weight of α-phase.

8. A method of manufacturing a silicon nitride sintered body according to claim 7, wherein the silicon nitride raw material powder has a total content of Fe, Ca, Na and K impurities of not more than 3% by weight, an average particle size of not more than 5 μm and a BET specific surface area of from 1 to 50 $m^2/g$.

* * * * *